Dec. 22, 1931. V. G. COLE 1,837,760
NUT LOCK
Filed June 16, 1931
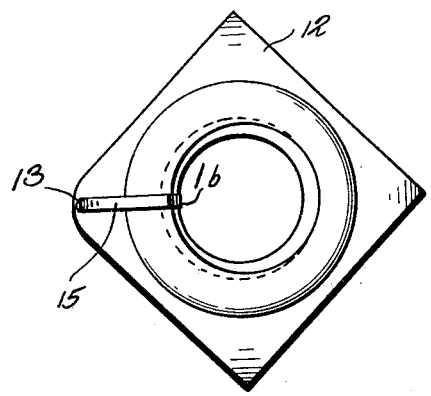
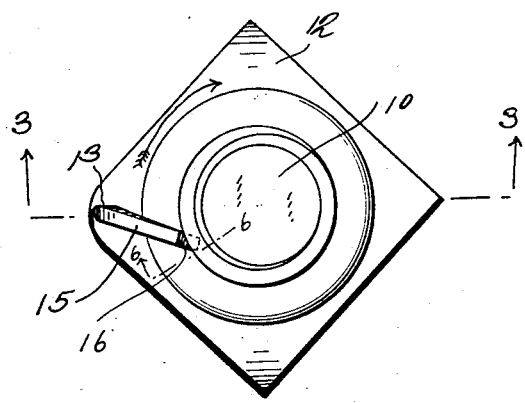
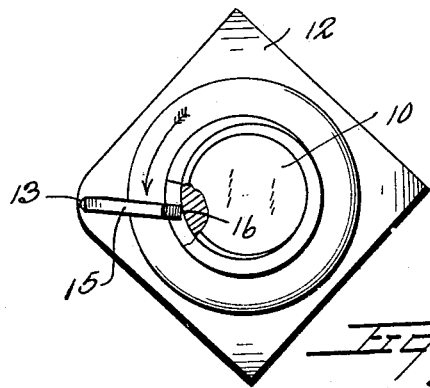
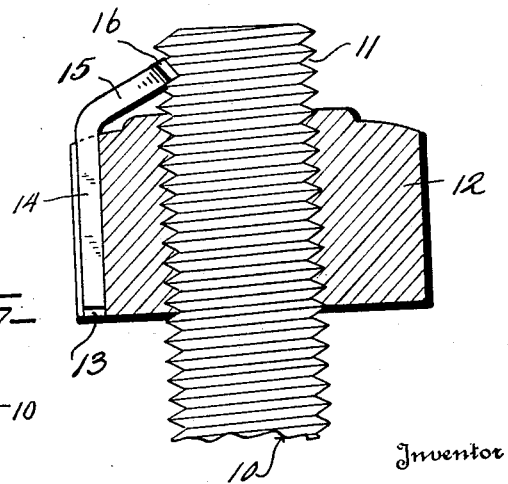
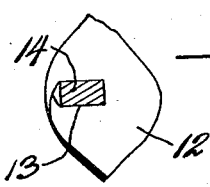
Inventor
V. G. Cole
By Watson E. Coleman
Attorney Patented Dec. 22, 1931

1,837,760

UNITED STATES PATENT OFFICE

VICTOR G. COLE, OF ELWOOD, INDIANA

NUT LOCK

Application filed June 16, 1931. Serial No. 544,823.

This invention relates to nut locks and the present application is a continuation in part of the nut lock illustrated and described in my prior applications, Serial No. 338,221 filed on February 7, 1929, and application 457,306, filed May 29, 1930.

The general object of this invention is to provide a nut lock which is so constructed that the nut is provided with a bolt engaging member normally disposed in a radial position to project slightly over the opening in the nut but which, when the nut is screwed on the bolt, is deflected against the torsional stress of the locking member so that this locking member acts as a pawl which bites into the thread of the bolt when it is attempted to draw the nut in the opposite direction or reversely.

A further object is to provide a nut lock of this character in which the locking member not only extends radially but upwardly and inwardly so that when the locking member has been deflected by running the nut upon the bolt, the extremity of the locking member will bear upward against a thread of the bolt and will act when it is adapted to reverse the nut to bite into this thread.

A further object is to form a locking member having an angularly disposed shank extending parallel to the axis of the aperture of the nut, which shank is entirely embedded within the nut so that this shank will resist any deflection of the locking member from a radial position.

Other objects will appear in the course of the following description.

My invention is illustrated in the accompanying drawings, wherein:—

Figure 1 is a plan view of the nut constructed in accordance with my invention;

Figure 2 is a similar view with the nut mounted on the bolt;

Fig. 3 is a sectional view on the line 3—3 of Fig. 2;

Figure 4 is a view similar to Figure 2 partially broken away;

Figure 5 is a fragmentary detailed view illustrating the mounting of the shank 14;

Figure 6 is a fragmentary vertical sectional view of the bolt showing in elevation the adjacent end of the blade taken on the line 6—6 of Figure 2.

Referring to these drawings, 10 designates a bolt having the usual threads 11. 12 designates the nut which may, of course, be square, hexagonal or have any other desired shape. The outside edge of the nut preferably at one corner is formed with a longitudinally extending slot 13. Disposed in this slot is the shank 14 of a locking member 15. This locking member, as illustrated in Figure 5, is made of high carbon, flattened steel wire.

The portion 15 is disposed at an obtuse angle to the shank portion 14. The shank 14 is disposed within the milled groove 13 in the nut and held in place by pressing the walls of the groove for its entire extent against and over the outer face of the shank.

Normally the portion 15 extends radially to the central aperture of the nut and projects over slightly beyond this aperture. The end face of the locking member 15 is cut off at an obtuse angle to the axis of the locking member so as to form a beveled end which will engage within the screw-threads 11.

When the nut is placed upon the bolt and rotated on to the bolt, the locking member 15 will be deflected into a tangential position with reference to a circle concentric to the axis of the bolt as shown in Figure 2. Under these circumstances, the angled corner formed at the junction of the end face 16 and the side face of the locking portion 15 will bear against one of the threads of the bolt while this face 16 will extend inward and longitudinally against one face of the thread. It is to be particularly pointed out that inasmuch as the locking member 15 is formed of high carbon steel, this locking member is rigid against any deflection except a deflection from a radial position to a tangential position. In other words, this locking member does not tend to bow out or bend when the nut is reversely turned. When it is attempted to turn the nut reversely, however, or turn the bolt reversely either one, this rigid locking member 15 is forced into the nut and cuts into the thread thereof. While under these circumstances, it is impossible for the nut to jar loose, and it may be remarked that this nut has been thoroughly tested on railroad frogs where the jar of constantly passing trains is very great, yet by the application of a suitable wrench to the nut, the nut may be turned off. Under these circumstances, the locking member 15 will be deflected from its tangential locking position to a radial position, cutting deep into the threads of the bolt, and then again to a tangential position. When the nut has been turned off, the locking member will spring back to its radial position. The locking member springs when forced from a radial to a tangential position by turning a nut on the bolt or turning it off the bolt, against the action of the torque resistance offered by the shank 14 which is held along its entire extent by the walls of the groove 13. There is no rocking of the shank 14 within the groove 13 which would, therefore, make the locking element relatively weak. In this lock, the resistance to the turning movement is in the form of a straight and direct thrust of the blade and locking member 15 from the face of the nut to the bolt.

Not only does the obtuse angle given to the locking portion 15 cause this locking portion to engage upward against the thread, but it offers a means of adjustment so that if and when the locking blade or portion 15 becomes sprung too far away to properly engage the threads of the bolt, it can be adjusted easily by pressing or hammering the edge of the blade down closer to the face of the nut. This causes the edge of the blade to extend farther out across this orifice of the nut opening. Inasmuch as the shank 14 is disposed within a closely fitting groove so that there is no play between the shank 14 and the groove 13, it follows that there is no tendency to wear the socket or walls of the groove for the shank 14.

Actual tests of this nut have been made on some thirty-seven railroads particularly at frogs, railway crossings and other places where nuts would be submitted to the most severe tests, the nut also having been tested in connection with trucks, airplanes, automobiles and other machines and it has been found under all circumstances that this lock holds against the most severe jars or vibrations. At the same time, the nut may be turned off and then reused.

I claim:—

1. A nut lock comprising a nut having a threaded aperture and having a longitudinally extended many-sided groove adjacent the outer edge face of the nut, and a locking member having a many-sided shank disposed in said groove and held thereby against turning movement, the shank having a straight, longitudinally rigid locking portion normally disposed radially relative to the center of the aperture but deflectable against the torsion of the shank by the rotation of the shank on the bolt, said locking portion being disposed at an obtuse angle to said shank, the locking portion at its inner end having a thread engaging end face disposed in a plane approximately at right angles to the lateral faces of the locking portion.

2. A nut lock comprising a nut having a threaded aperture and having a longitudinally extended many-sided groove adjacent the outer edge face of the nut, and a locking member having a many-sided shank disposed in said groove and held thereby against turning movement, the shank having a straight, longitudinally rigid locking portion normally disposed radially relative to the center of the aperture but deflectable against the torsion of the shank by the rotation of the shank on the bolt, said locking portion being disposed at an obtuse angle to said shank, the locking portion at its inner end having a thread engaging end face disposed in a plane approximately at right angles to the lateral faces of the locking portion and extending inward and toward the nut to provide a thread engaging end face and a thread cutting corner at the junction of the end face with one of the lateral faces of the locking portion.

3. A nut lock comprising a nut having a threaded aperture and having a longitudinally extended many-sided groove adjacent the edge face of the nut, the groove having a length equal to the thickness of the nut, and a locking member having a shank and a blade portion, the blade and shank being disposed at an obtuse angle to each other, the shank having a length equal to the length of the groove and fitting said groove, the blade extending radially with reference to the central aperture of the nut and normally projecting slightly beyond the same, the extremity of the blade being disposed in a plane at right angles to the lateral faces of the blade but at an acute angle to the inner edge face of the blade.

In testimony whereof I hereunto affix my signature.

VICTOR G. COLE.